(12) United States Patent
Achterman

(10) Patent No.: US 9,567,736 B1
(45) Date of Patent: Feb. 14, 2017

(54) TOILET FILL VALVE AUXILIARY SHUTOFF MECHANISM

(71) Applicant: Kermit L. Achterman, La Canada Flintridge, CA (US)

(72) Inventor: Kermit L. Achterman, La Canada Flintridge, CA (US)

(*) Notice: Subject to any disclaimer, the term of this patent is extended or adjusted under 35 U.S.C. 154(b) by 0 days.

(21) Appl. No.: 15/186,001

(22) Filed: Jun. 17, 2016

(51) Int. Cl.
| | |
|---|---|
| *F16K 11/02* | (2006.01) |
| *E03D 1/32* | (2006.01) |
| *E03D 1/36* | (2006.01) |
| *F16K 1/12* | (2006.01) |
| *F16K 31/08* | (2006.01) |
| *G05D 7/06* | (2006.01) |
| *E03D 11/18* | (2006.01) |
| *E03D 11/02* | (2006.01) |

(52) U.S. Cl.
CPC . *E03D 1/32* (2013.01); *E03D 1/36* (2013.01); *E03D 11/02* (2013.01); *E03D 11/18* (2013.01); *F16K 1/12* (2013.01); *F16K 31/088* (2013.01); *G05D 7/0617* (2013.01); *Y10T 137/8242* (2015.04)

(58) Field of Classification Search
CPC .............. E03D 1/32; E03D 1/36; E03D 11/02; E03D 11/18; F16K 1/12; F16K 31/088; F16K 31/086; F16K 11/08; G05D 7/0617
USPC ........................................ 137/553, 554, 558
See application file for complete search history.

(56) References Cited

U.S. PATENT DOCUMENTS

| | | | |
|---|---|---|---|
| 3,355,140 A * | 11/1967 | Andersen ................ | F16K 1/12 251/129.01 |
| 3,441,052 A | 4/1969 | Schiling | |
| 5,611,368 A * | 3/1997 | Hwang et al. ......... | F16J 15/50 137/553 |
| 6,058,519 A | 5/2000 | Quintana | |
| 6,367,096 B1 | 4/2002 | Quintana | |
| 6,671,893 B1 | 1/2004 | Quintana et al. | |
| 6,877,170 B1 | 4/2005 | Quintana et al. | |
| 6,934,977 B1 | 8/2005 | Quintana et al. | |
| 7,000,627 B1 | 2/2006 | Johnson | |
| 7,503,341 B1 | 3/2009 | Achterman | |
| 7,591,282 B1 | 9/2009 | Achterman | |
| 7,644,726 B1 | 1/2010 | Achterman | |
| 8,033,291 B2 * | 10/2011 | Randolph ............... | E03D 1/32 137/429 |
| 8,534,313 B1 | 9/2013 | Achterman | |
| 8,844,067 B2 | 9/2014 | Quintana et al. | |
| 9,441,354 B2 * | 9/2016 | Liu et al. ............... | E03D 1/32 |

(Continued)

*Primary Examiner* — Kevin Lee
(74) *Attorney, Agent, or Firm* — QuickPatents, LLC; Kevin Prince

(57) ABSTRACT

A shutoff valve connects between a toilet fill valve and a water supply line for a toilet tank. A housing containing a valve mechanism is positionable between open and closed positions. A latching mechanism holds the valve mechanism in the open position unless receiving an electric signal from an electronic sensing system upon detection of a fault condition. A manually-actuated reset lever returns the valve mechanism to the open position. The electronic sensing system includes at least one water level sensor for sensing a water level in the toilet tank, the electronic sensing system programmed to detect a slow flush valve leak, a stuck-open flush valve, or a high water level fault. Another water level sensor may be included in the toilet bowl to detect a plugged toilet fault condition.

12 Claims, 7 Drawing Sheets

(56) References Cited

U.S. PATENT DOCUMENTS

2005/0248465 A1* 11/2005 Flaherty .................... G01F 1/22
340/605

* cited by examiner

TOILET FILL VALVE AUXILIARY SHUTOFF MECHANISM

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to valve actuators, and more particularly to a toilet fill valve shutoff mechanism.

DISCUSSION OF RELATED ART

Conventional toilet fill valves include a fill valve float mechanism that lifts an arm in response to a rising water level in a toilet tank. The arm closes the toilet fill valve when lifted by the fill valve float mechanism. Such prior art valves, and other toilet components, are prone to frequent failure. For example, when a toilet becomes "plugged" due to an obstruction in the toilet drain, flushing of the toilet may result in overflow of the toilet bowl and subsequent property damage to the surrounding area. Prior art toilet valves do not provide for shutting the water supply off when a high-level condition in a toilet bowl is detected, which would be beneficial for reducing property damage.

Further, prior art toilet fill valves may leak, that is, not completely shut off when the water level in the toilet tank reaches the "full" water level position within the tank. As such, the water level in the tank can reach a high-level where water either continuously drains down an auxiliary drain if the toilet includes such a provision, or water could overflow the toilet tank and again result in property damage.

The prior art flush valve (flapper) in a toilet is also prone to frequent failures. In one instance, the flush valve may become "stuck open" whereby the fill valve runs continuously because the water level in the tank is never able to rise. As a result, a significant amount of water may be wasted while such a valve is stuck open. Moreover, such prior art flush valves may leak, which results in the water level in the tank slowly lowering until the float reaches a point that it opens the fill valve. As the fill valve typically introduces water into the tank at a faster rate than such a leaky flush valve leaks water, the water level in the tank rises to the point where the float shuts off the fill valve. But the flush valve continues to leak, and a repeating cycle of filling the tank ensues, again resulting in a significant waste of water and greater expense to the property owner. None of the prior art toilet fill valves provides for detecting either of these flush valve fault conditions to shut-off the water and prevent waste thereof.

Therefore, there is a need for a device that can detect a toilet bowl high water level fault, a toilet tank high water level fault, a "stuck open" flush valve, and a leaky flush valve and shut-off the toilet water supply accordingly. Such a needed device would be relatively easy to affix to prior art fill valves, and would be relatively easy to install on a conventional toilet. Such a needed device would further provide means for alerting a user as to the fault condition. The present invention accomplishes these objectives.

SUMMARY OF THE INVENTION

The present device is a shutoff valve for connecting between a toilet fill valve and a water supply line for a toilet tank of a toilet. Typically the toilet fill valve is within the toilet tank but is accessible from outside of the toilet tank with the water supply line. The shutoff valve is connected between the water supply line and the toilet fill valve on the outside of the toilet tank.

A substantially hollow, rigid housing is fixed at a lower end thereof with a rigid cap containing a water inlet port that is adapted for connection to the water supply line. The housing is connected at an upper end thereof with a rigid mounting adapter that includes a water shutoff port and a water outlet port adapted for connection to the toilet fill valve. A water flow path is defined from the water inlet port of the cap, through the cap, housing and mounting adapter, to the water outlet port of the mounting adapter.

A valve mechanism comprises a rigid, slidable poppet that is rotationally fixed and slidably constrained within the housing between open and closed positions. An elastomeric seal is included that, when moved axially against the water shutoff port of the mounting adapter, blocks the flow of water through the port. A rigid actuating mechanism comprises a positive, even number of permanent magnets mounted symmetrically about the slidable poppet and with alternating polarity to form a magnet pattern.

A freely rotatable, rigid ring is captured within the housing and contains permanent magnets in the same magnet pattern as the slidable poppet. As such, when the magnet pattern of the slidable poppet is in an aligned position with like polarity to the magnet pattern of the rotatable ring, the slidable poppet is magnetically repelled away from the rotatable ring and the elastomeric seal is held away from the water shutoff port of the mounting adapter. This allows water to flow along the water flow path. The rotating ring is held in this aligned position by a latching mechanism that, when released, allows the rotating ring to rotate so that the magnet pattern thereof becomes misaligned with the magnet pattern of the slidable poppet in a misaligned position. As such, the rotating ring then magnetically attracts the slidable poppet into the closed position whereby the elastomeric seal is forced against the water shutoff port to block the water flow path.

The latching mechanism comprises an electrically operated actuator for holding the rotating ring in the aligned position and releasing the rotating ring upon receiving an electrical signal from an electronic sensor system. A position indicator switch is adapted to indicate the position of the rotatable ring. A reset lever is attached to the rotating ring for selectively returning the rotating ring to the aligned position.

The electronic sensing system includes at least one sensor and a power source, such as a battery, AC adapter, or the like. The electronic sensing system is electrically connected with the latching mechanism to activate the electrically operated actuator upon detection of a fault condition based on the input of the at least one sensor.

In preferred embodiments, the electronic sensing system further includes a control module, a circuit board, an audible warning device, and at least one LED indicator, such that the control module energizes the audible warning device and the at least one LED indicator to alert a user to the fault condition. In some embodiments, the control module further includes an external communications port wherein the electronic sensing system is adapted to set an indication of the type of fault condition on the external communications port. As such, an external alarm system connected to the external communications port may be utilized to alert the user to any of the fault conditions. A wireless transmitter may be used for wirelessly transmitting the indication of a fault condition to the external alarm system. The control module, circuit board, audible warning device, the at least one LED indicator, and battery are all contained within a water-resistant or water-impervious enclosure.

At least one of the at least one sensor is preferably a water level sensor for sensing a water level in the toilet tank. With such a water level sensor, the electronic sensing system is programmed to detect a slow flush valve leak by observing over a predetermined period of time a repeating pattern of a water level decreasing slowly relative to a regular flush of the toilet, and then increasing as the fill valve refills the toilet tank. The electronic sensing system may be further programmed to detect a stuck-open flush valve by observing a continuous low water level in the toilet tank. Even further, the electronic sensing system may be programmed to detect a high water level fault by observing a continuous high water level in the toilet tank. In any of these cases, the fault condition is established and the electronic sensing circuit energizes the latching mechanism to close the shutoff valve.

Such a water level sensor may also be fixed within a toilet bowl of the toilet as an external sensor or internally to the bowl. As such, the electronic sensing system may be programmed to detect a toilet bowl high water level fault by observing a high water level in the toilet bowl, establishing the fault condition to trigger the latching mechanism to unlatch the rotatable ring to close the shutoff valve.

The present invention is a device that detects a toilet bowl high water level fault, a toilet tank high water level fault, a "stuck open" flush valve, and a leaky flush valve and shuts-off the toilet fill valve accordingly. The present invention is relatively easy to affix to prior art toilet fill valves, and is relatively easy to install on a conventional toilet. The present device further provides means for alerting a user as to the fault condition. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
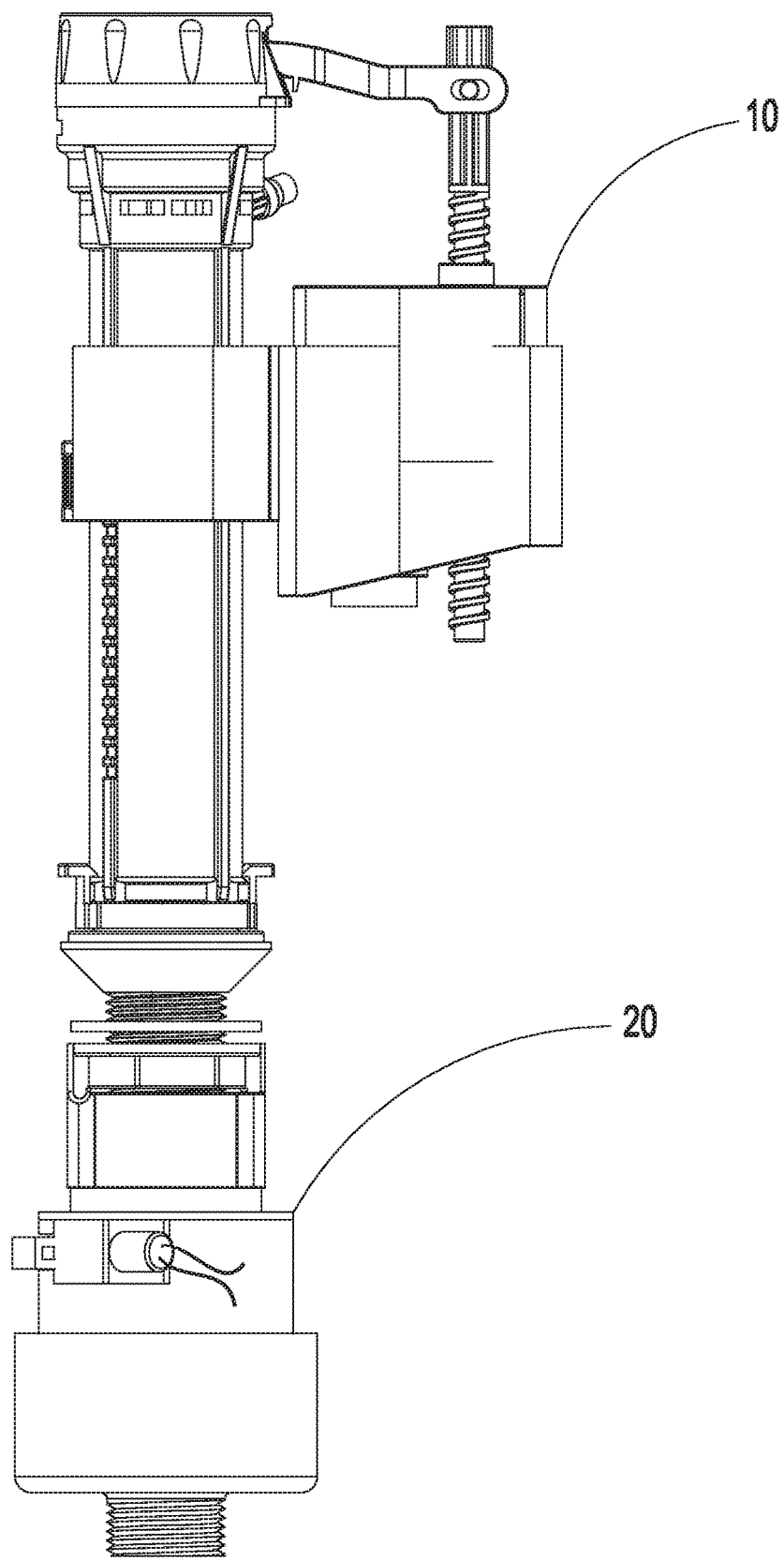
FIG. 1 is a front elevational view of the invention as fitted to a toilet fill valve, a toilet tank being omitted for clarity of illustration.
Figure 4:
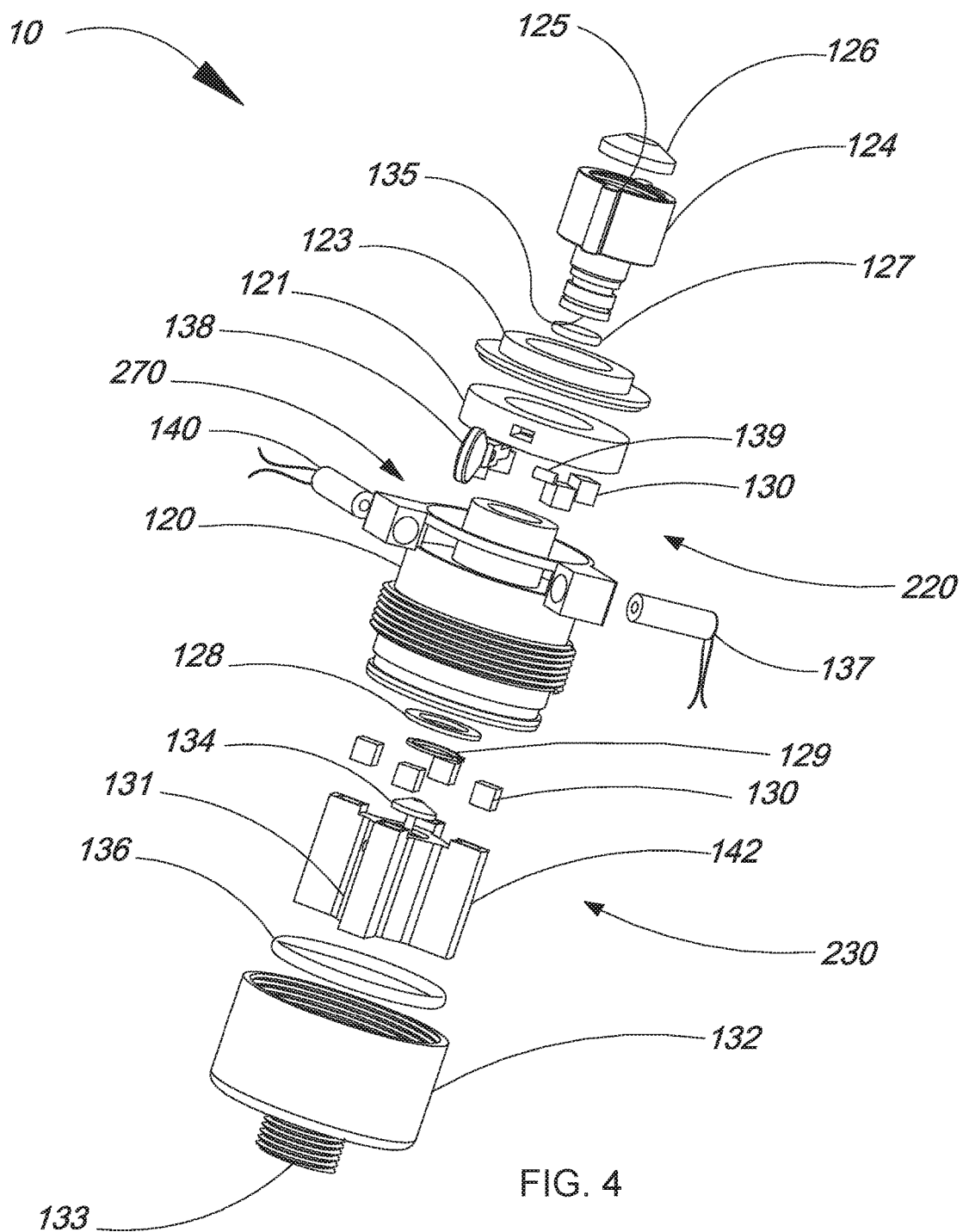
FIG. 4 is an exploded perspective view of the invention.
Figure 5:
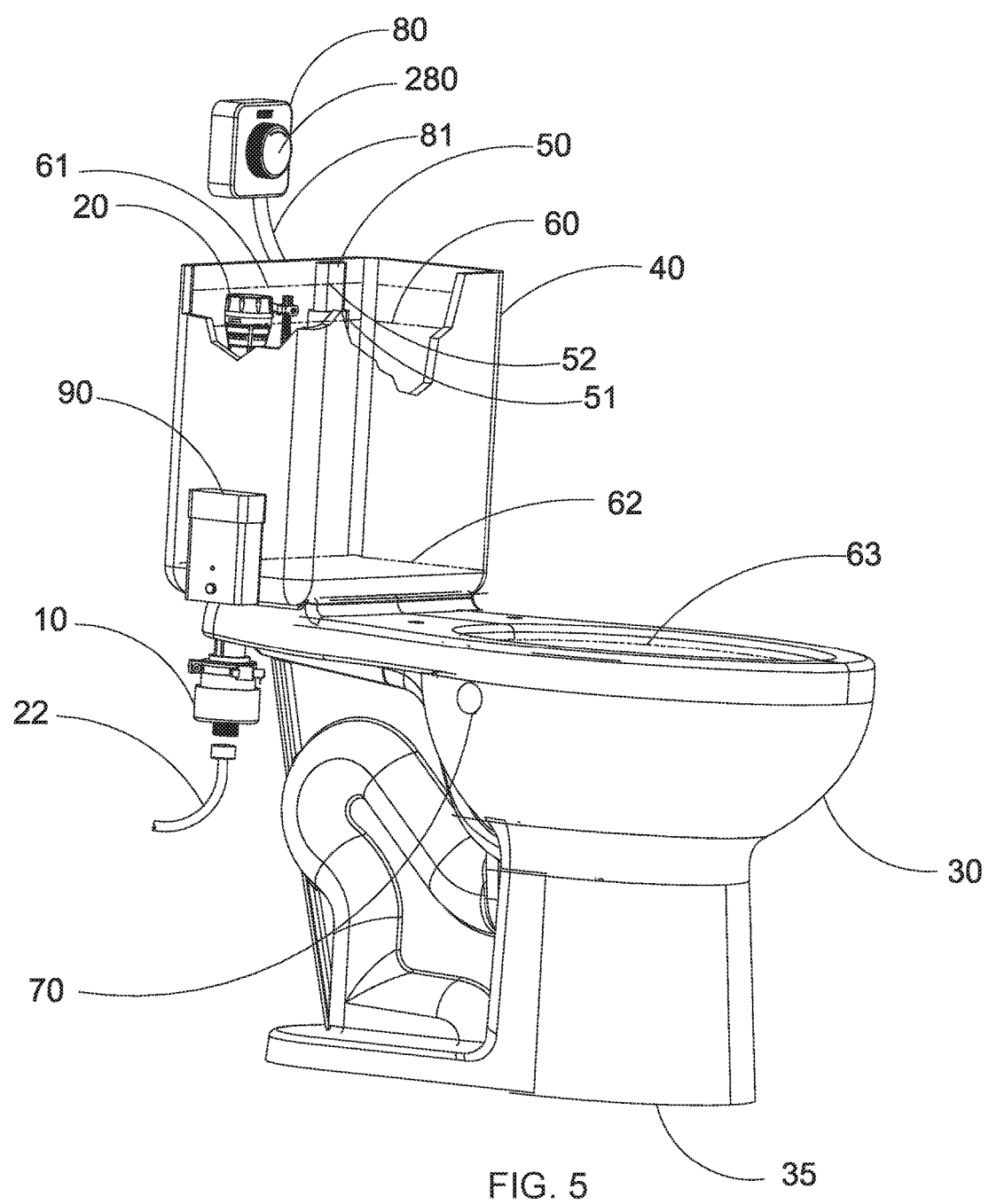
FIG. 5 is a partially cut-away perspective view of the invention as installed on a toilet.

FIGS. 1, 4 and 5 illustrate a shutoff valve 10 for connecting between a toilet fill valve 20 and a water supply line 22 for a toilet tank 40 of a toilet 35. Typically the toilet fill valve 20 is within the toilet tank 40 but is accessible from outside of the toilet tank 40 with the water supply line 22. The shutoff valve 10 is connected between the water supply line 22 and the toilet fill valve 20 on the outside of the toilet tank 40 (FIG. 5).

A substantially hollow, rigid housing 120 is fixed at a lower end 222 thereof with a rigid cap 132 containing a water inlet port 133 that is adapted for connection to the water supply line 22. The housing 120 is connected at an upper end 228 thereof with a rigid mounting adapter 124 that includes a water shutoff port 135 and a water outlet port 125 adapted for connection to the toilet fill valve 20. A water flow path 141 is defined from the water inlet port 133 of the cap 132, through the cap 132, housing 120 and mounting adapter 124, to the water outlet port 125 of the mounting adapter 124. Preferably the housing 120, cap 132, and mounting adapter 124 are made from a suitably strong and rigid injection-molded plastic material.

Figure 2:
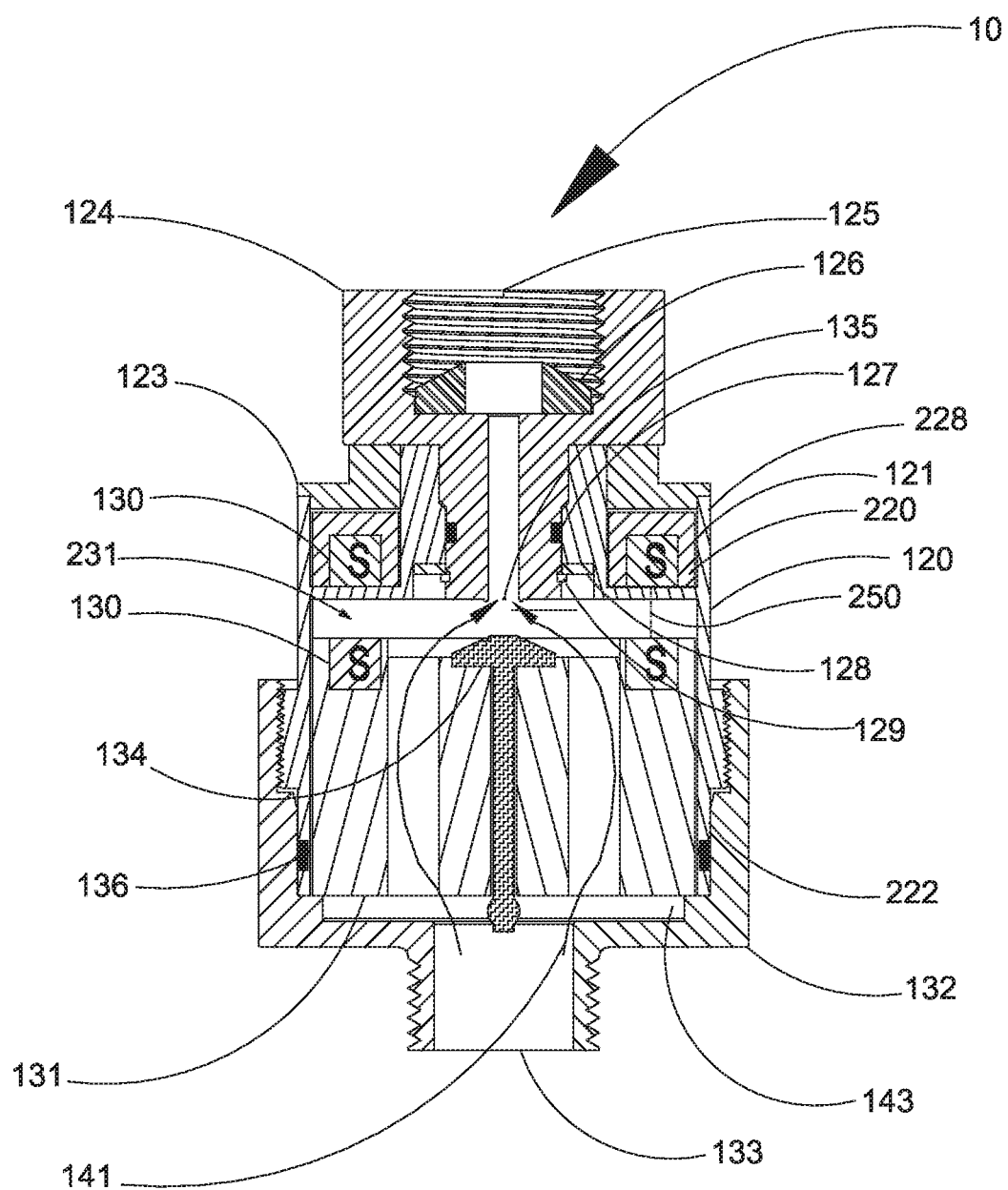
FIG. 2 is a diametrical cross-sectional view of the invention, illustrated in an open position.
Figure 3:
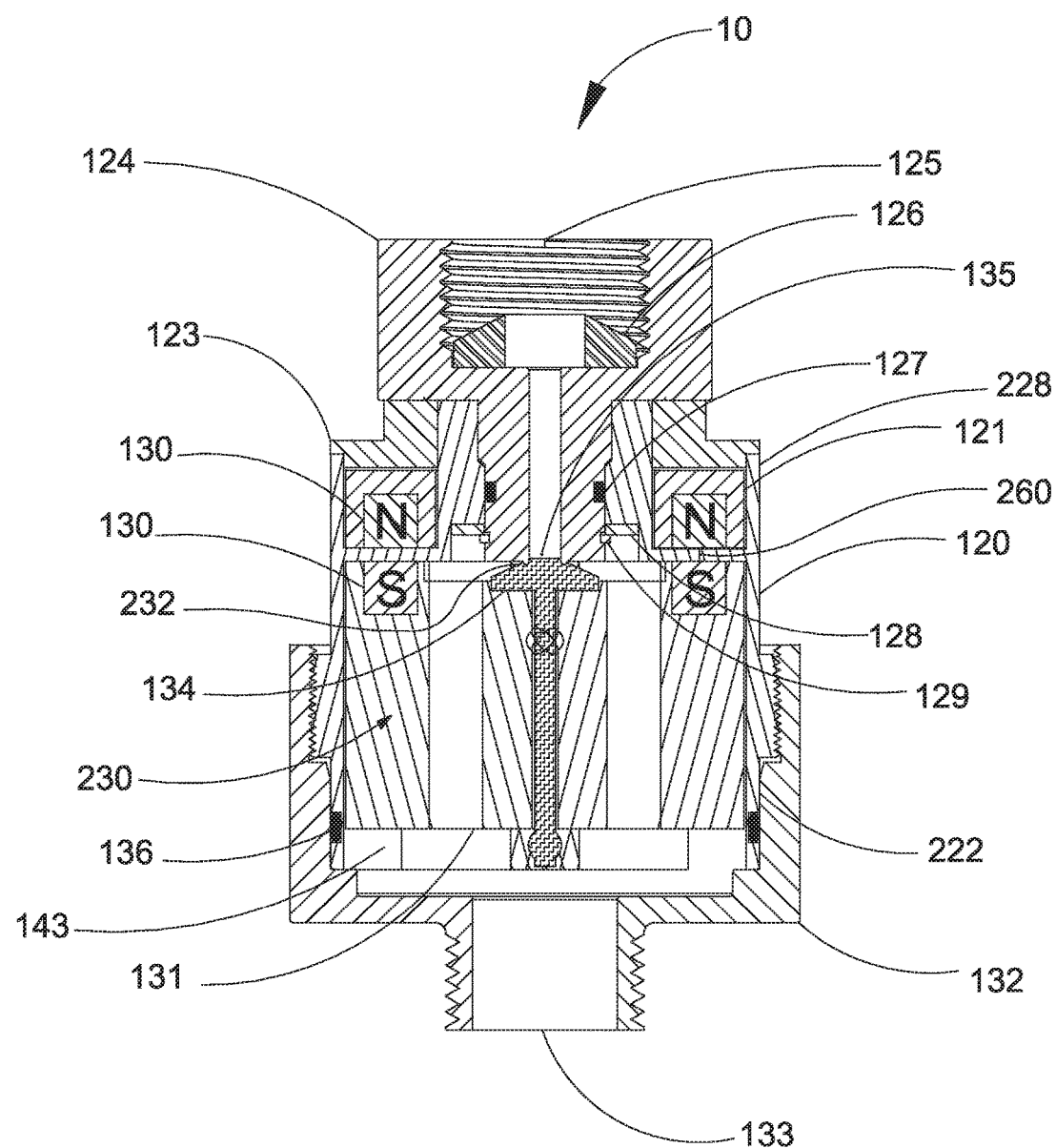
FIG. 3 is a diametrical cross-sectional view of the invention, illustrated in a closed position.
Figure 7:
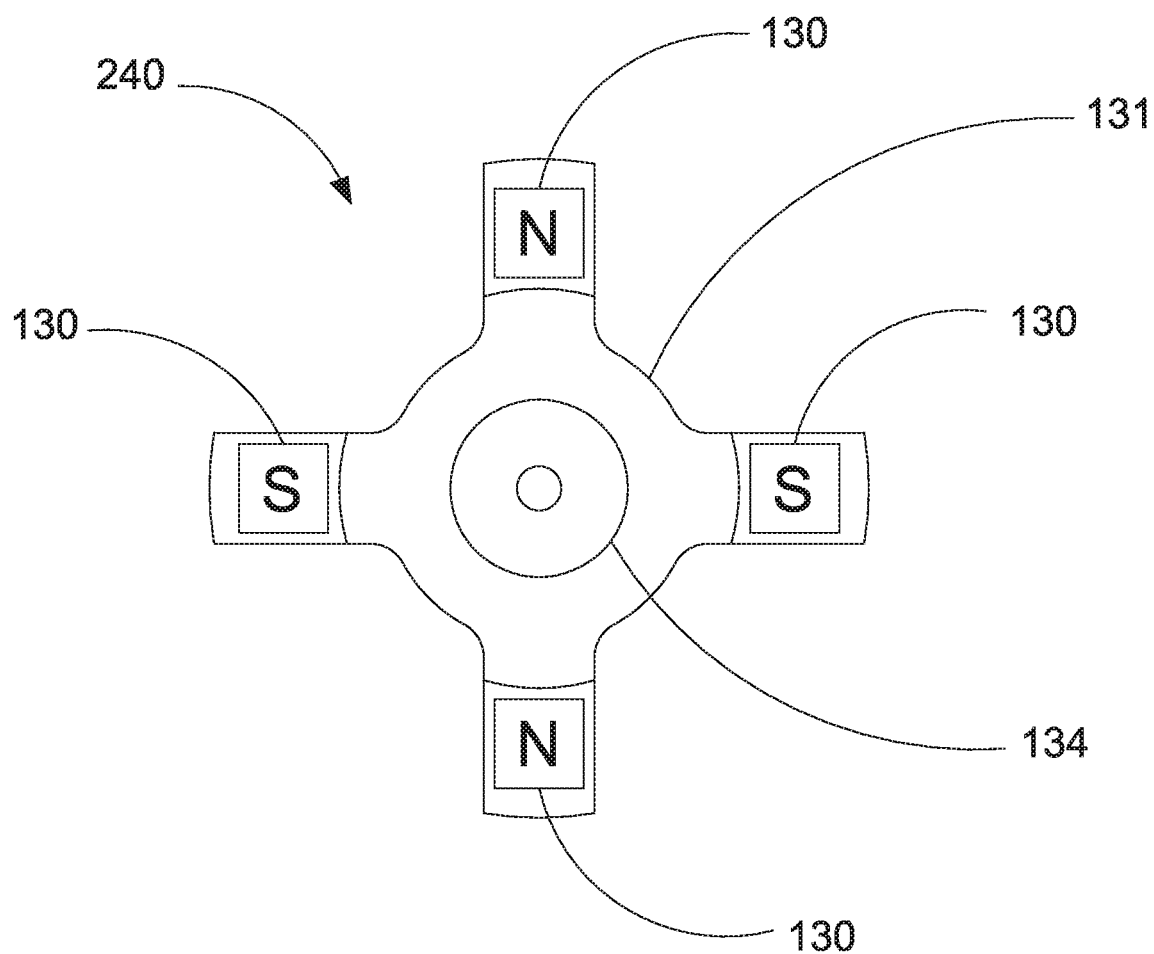
FIG. 7 is a top plan view of one embodiment of a magnet pattern of a valve mechanism of the invention.

A valve mechanism 230 comprises a rigid, slidable poppet 131 that is rotationally fixed and slidably constrained within the housing 120 between an open position 231 (FIG. 2) and a closed position 232 (FIG. 3). An elastomeric seal 134 is included that, when moved axially against the water shutoff port 135 of the mounting adapter 124, blocks the flow of water through the port 135. A rigid actuating mechanism 220 comprises a positive, even number of permanent magnets 130 (FIGS. 4 and 7), such as four magnets 130 each arranged 90-degrees away from the next, mounted symmetrically about the slidable poppet 131 in plan view (FIG. 7) and with alternating polarity to form a magnet pattern 240.

A freely rotatable, rigid ring 121 is captured within the housing 120 by a rotating ring retainer 123 and contains permanent magnets 130 in the same magnet pattern 240 as the slidable poppet 131. As such, when the magnet pattern 240 of the slidable poppet 131 is in an aligned position 250 with like polarity to the magnet pattern 240 of the rotatable ring 121, the slidable poppet 131 is magnetically repelled away from the rotatable ring 121 and the elastomeric seal 134 is held away from the water shutoff port 135 of the mounting adapter 124. This allows water to flow along the water flow path 141. The rotating ring 121 is held in this aligned position 250 by a latching mechanism 270 that, when released, allows the rotating ring 121 to rotate so that the magnet pattern 240 thereof becomes misaligned with the magnet pattern 240 of the slidable poppet 131 in a misaligned position 260. As such, the rotating ring 121 then magnetically attracts the slidable poppet 131 into the closed position 232 whereby the elastomeric seal 134 is forced against the water shutoff port 135 to block the water flow path 141. Further included in the housing 120 are a water outlet gasket 126, a mounting adapter O-ring seal 127, a thrust washer 128, a retaining ring 129, and a cap O-ring seal 136, all of which serve to prevent leakage and maintain the other elements properly in place within the housing 120.

The latching mechanism 270 comprises an electrically operated actuator 137 for holding the rotating ring 121 in the aligned position 250 and releasing the rotating ring 121 upon receiving an electrical signal from an electronic sensor system 90. A position indicator switch 140 is adapted to indicate the position of the rotatable ring 121. A reset lever 138 is attached to the rotating ring 121 for selectively returning the rotating ring 121 to the aligned position 250. In some embodiments the reset lever 138 is directly manually actuable. In other embodiments, a cable 81 (FIG. 5) extends from the rotating ring 121 to an actuator knob 280, such that the position indicator switch 80 may be located in a convenient location for manually actuating the actuator knob 280 to actuate the reset lever 138 via the cable 81.

The electronic sensing system 90 includes at least one sensor 50 and a power source 91, such as a battery 91, AC adapter (not shown), or the like. The electronic sensing system 90 is electrically connected with the latching mechanism 270 to activate the electrically operated actuator 137 upon detection of a fault condition based on the input of the at least one sensor 50.

Figure 6:
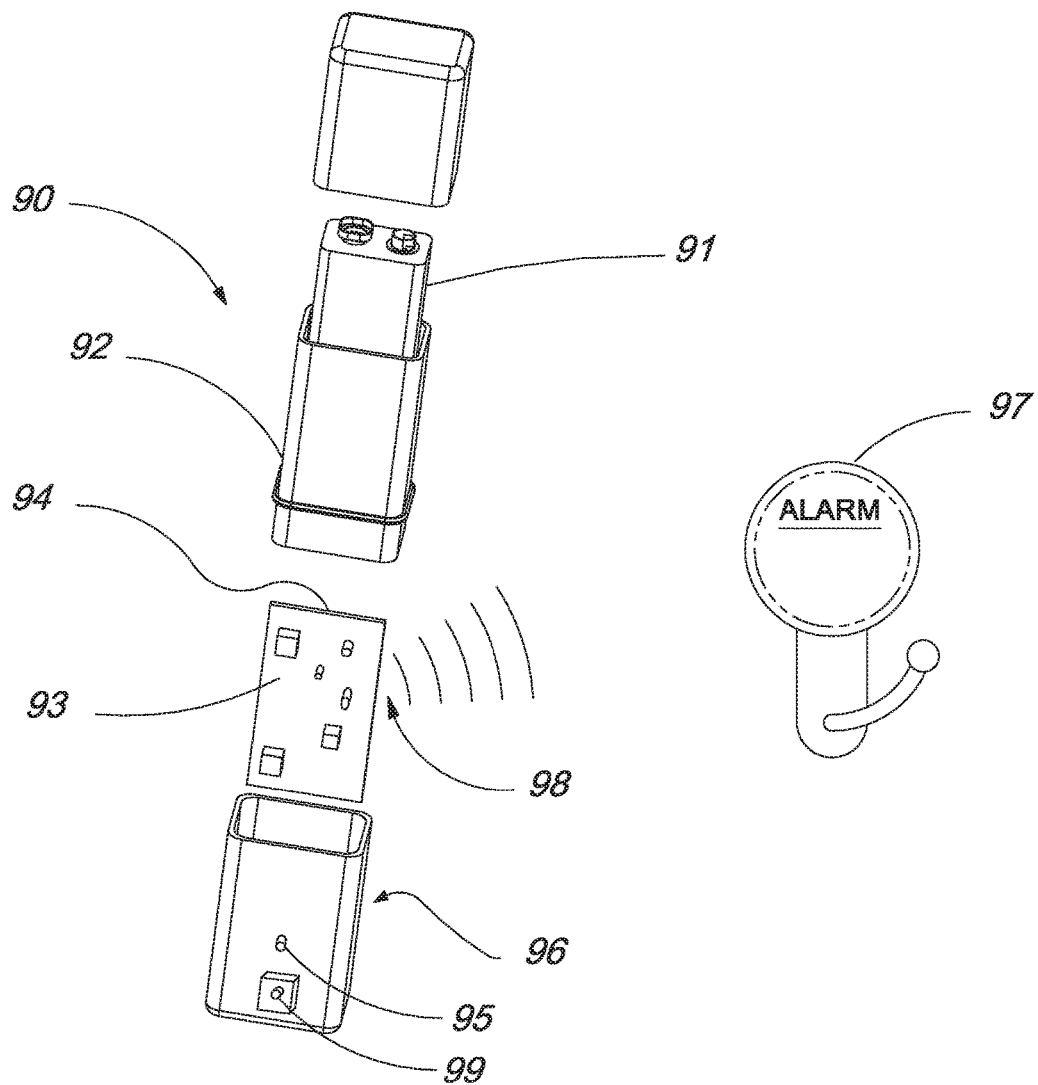
FIG. 6 is an exploded perspective view of an electronic sensor system of the invention wirelessly connected with an alarm.

In preferred embodiments, the electronic sensing system 90 further includes a control module 92 (FIG. 6), a circuit board 93, an audible warning device 94, and at least one LED indicator 95, such that the control module 92 energizes the audible warning device 94 and the at least one LED indicator 95 to alert a user to the fault condition. In some embodiments, the control module 92 further includes an external communications port 99 wherein the electronic sensing system 90 is adapted to set an indication of the type of fault condition on the external communications port 99. As such, an external alarm system 97 connected to the external communications port 99 may be utilized to alert the user to any of the fault conditions. A wireless transmitter 98 may be used for wirelessly transmitting the indication of a fault condition to the external alarm system 97. Preferably the control module 92, circuit board 93, audible warning device 94, the at least one LED indicator 95, and battery 91 are all contained within a water-resistant or water-impervious enclosure 96. The LED indicator 95 may also include a code read switch (not shown) that, when depressed, causes the control module 92 to display a fault code by flashing the LED indicator 95, so as to alert a user as to what type of fault condition exists.

At least one of the at least one sensor 50 is preferably a water level sensor 51 (FIG. 6) for sensing a water level 60 in the toilet tank 40. With such a water level sensor 51, the electronic sensing system 90 is programmed to detect a slow flush valve leak by observing over a predetermined period of time a repeating pattern of a water level decreasing slowly, but not reaching a low water level 62 as in a flush of the toilet 35, and then increasing as the fill valve 20 refills the toilet tank 40. The electronic sensing system 90 may be further programmed to detect a stuck-open flush valve by observing the continuous low water level 62 in the toilet tank 40. Even further, the electronic sensing system 90 may be programmed to detect a high water level fault by observing a continuous high water level 61 in the toilet tank 40. In any of these cases, the fault condition is established and the electronic sensing circuit 90 energizes the latching mechanism 270 to close the shutoff valve 10.

Such a water level sensor 51 may also be fixed within a toilet bowl 30 of the toilet 35 as an external sensor 70 or internally to the bowl 30 (not shown). As such, the electronic sensing system 90 may be programmed to detect a toilet bowl high water level fault by observing a high water level 63 in the toilet bowl 30, establishing the fault condition to trigger the latching mechanism 270 to unlatch the rotatable ring 121 to close the shutoff valve 10.

The at least one sensor 50 is preferably either hard wired or wirelessly connected with the electronic control system 90. Likewise, the electronic control system 90 is either hard wired or wirelessly connected with the latching mechanism 270 of the housing 120. Such a sensor 50 that is wirelessly connected with the electronic control system 90 further includes a battery, preferably, or an AC adapter port for powering the sensor.

While a particular form of the invention has been illustrated and described, it will be apparent that various modifications can be made without departing from the spirit and scope of the invention. For example, the particular shapes of the components of the invention may take various shapes and forms, and is not limited to those shown in the figures. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A shutoff valve for connecting between a toilet fill valve and a water supply line for a toilet tank, comprising:
   a substantially hollow housing fixed at a lower end thereof with a cap containing a water inlet port adapted for connection to the water supply line, the housing connected at an upper end thereof with a mounting adapter fitting including a water shutoff port and a water outlet port adapted for connection to the toilet fill valve, a water flow path being defined from the water inlet port of the cap, through the cap, housing and mounting adapter, to the water outlet port of the mounting adapter;
   a valve mechanism comprising a slidable poppet rotationally fixed and slidably constrained within the housing between an open position and a closed position, an elastomeric seal that when moved axially against the water shutoff port of the mounting adapter blocks the flow of water through said port, an actuating mechanism comprising a positive, even number of permanent magnets mounted symmetrically about the slidable poppet in plan view and with alternating polarity to form a magnet pattern;
   a freely rotatable ring captured within the housing and containing a positive, even number of permanent magnets in the same magnet pattern as the slidable poppet, such that when the magnet pattern of the slidable poppet is in an aligned position with like polarity to the magnet pattern of the rotatable ring, the slidable poppet is magnetically repelled away from the rotatable ring and the elastomeric seal is held away from the water shutoff port of the mounting adapter, allowing water to flow along the water flow path, the rotating ring being held in this aligned position by a latching mechanism that, when released, allows the rotating ring to rotate so that the magnet pattern thereof becomes misaligned with the magnet pattern of the slidable poppet in a misaligned position, whereby the rotating ring then magnetically attracts the slidable poppet into the closed position whereby the elastomeric seal is forced against the water shutoff port to block the water flow path;
   the latching mechanism comprising an electrically operated actuator for holding the rotating ring in the aligned position and releasing the rotating ring upon receiving an electrical signal from an electronic sensing system; a position indicator switch adapted to indicate the position of the rotatable ring; and a reset lever attached to the rotating ring for returning the rotating ring to its aligned position;
   the electronic sensing system including at least one sensor and a power source, the electronic sensing system electrically connected with the latching mechanism to activate the electrically operated actuator upon detection of a fault condition based on the input of the at least one sensor.

2. The shutoff valve of claim 1 wherein the electronic sensing system further includes a control module, a circuit board, an audible warning device, and at least one LED indicator, whereby the control module energizes the audible warning device and at least one LED indicator to alert a user to the fault condition.

3. The shutoff valve of claim 1 wherein one of the at least one sensor is a water level sensor for sensing the water level in a toilet tank, the electronic sensing system programmed to detect a slow flush valve leak by observing over a predetermined period of time a repeating pattern of a water level decreasing slowly compared relative to a regular flush of the toilet, and then increasing as the fill valve refills the toilet tank, whereby a fault condition is established and the electronic sensing circuit energizes the latching mechanism to close the shutoff valve.

4. The shutoff valve of claim 1 wherein one of the at least one sensor is a water level sensor for sensing a water level in a toilet tank, the electronic sensing system programmed to detect a stuck-open flush valve by observing a continuous low water level in the toilet tank, whereby a fault condition is established and the electronic sensing system energizes the latching mechanism to close the shutoff valve.

5. The shutoff valve of claim 1 wherein one of the at least one sensor is a water level sensor for sensing a water level in a toilet bowl, the electronic sensing system programmed to detect a toilet bowl high water level fault by observing a high water level in the toilet bowl, whereby a fault condition is established and the electronic sensing circuit energizes the latching mechanism to close the shutoff valve.

6. The shutoff valve of claim 1 wherein one of the at least one sensor is a water level sensor for sensing a water level in the toilet tank, the electronic sensing system programmed to detect a high water level fault by observing a continuous high water level in the toilet tank, whereby a fault condition is established and the electronic sensing system energizes the latching mechanism to close the shutoff valve.

7. The shutoff valve of claim 2 wherein the control module further includes an external communications port, and wherein the electronic sensing system is adapted to set an indication of the type of fault condition on the external communications port, whereby an external alarm system connected to the external communications port may be utilized to alert a user to any fault condition.

8. The shutoff valve of claim 7 wherein the external communications port of the control module includes a wireless transmitter for wirelessly transmitting an indication of a fault condition to the external alarm system.

9. The shutoff valve of claim 2 wherein the power source is an AC adapter powered by line voltage.

10. The shutoff valve of claim 2 wherein the control module is in wireless communication with the at least one sensor, the at least one sensor further including at least a power source and a wireless data transmitting circuit.

11. The shutoff valve of claim 1 wherein the slidable poppet and the rotatable ring each include four permanent magnets and wherein the rotatable ring rotates 90-degrees between the aligned and misaligned positions.

12. The shutoff valve of claim 1 wherein the reset lever is manually actuated to return the rotatable ring to the aligned position.

* * * * *